W. H. Carpenter,
Basket.
No. 94,075.
Patented Aug. 24, 1869.
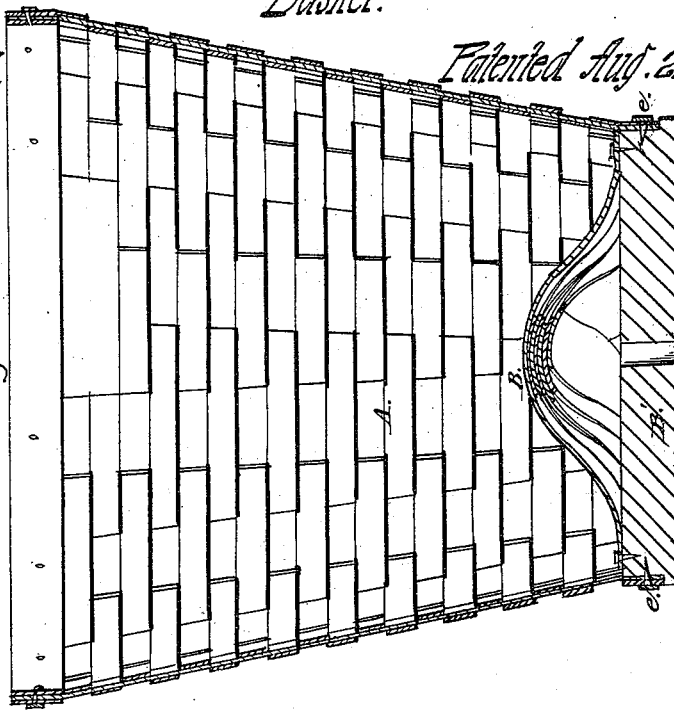
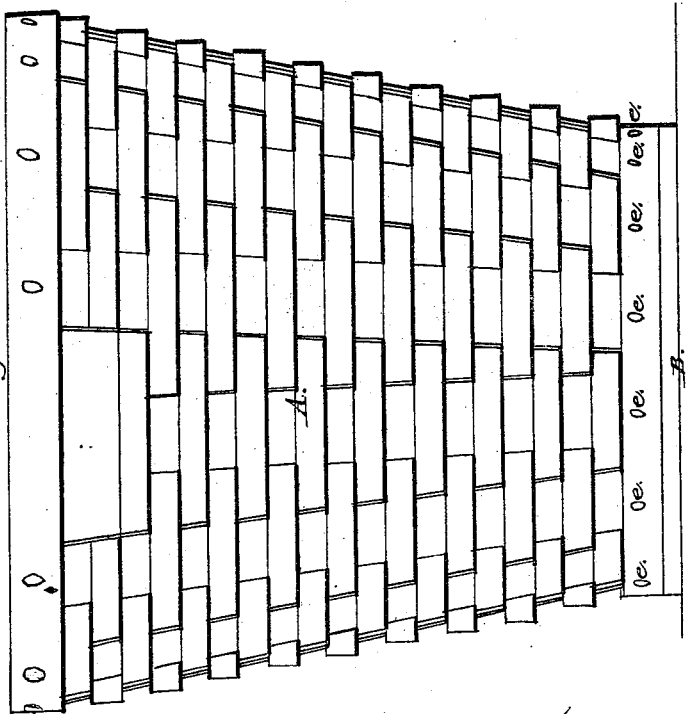
Witnesses:
J. W. Coombs
Edw. Adams
Inventor:
William H. Carpenter

United States Patent Office.

WILLIAM H. CARPENTER, OF NEW YORK, N. Y.

Letters Patent No. 94,075, dated August 24, 1869.

IMPROVEMENT IN BASKETS.

The Schedule referred to in these Letters Patent and making part of the same.

*To all whom it may concern:*

Be it known that I, WILLIAM H. CARPENTER, of the city, county, and State of New York, have invented a new and useful Improvement in "Fruit and other Baskets;" and I do hereby declare that the following is a full, clear, and exact description of the same, reference being had to the accompanying drawings, which form part of this specification, and in which—

Figure 1 represents an outside view of a fruit-basket constructed according to my invention, and Figure 2 represents a central section of the same.

Similar letters of reference indicate corresponding parts in both figures.

This invention relates to such baskets for containing fruit and other articles, as are constructed with arched or conical wicker bottoms. The advantage gained by the use of baskets having arched or conical wicker bottoms, owing partly to the elasticity of said bottoms, and partly to their arched and conical formation breaking up the fruit or other contents at the centre, and thereby shifting the weight toward the sides of the baskets, is the better preservation of said contents from injury by concussion during transportation. Said baskets, however, as ordinarily constructed, are liable to injury by the breaking of the splits at the point where they are bent in forming the angle between the bottom and sides.

The object of this invention is, while retaining the advantage of baskets of this description, to render them stronger and more durable; and to this end, It consists in a novel construction of such bottoms, whereby the desired end is attained.

Referring to the accompanying drawings—

A represents the sides or wall, and

B, the arched or conical bottom of a fruit-basket formed of splits woven together in the usual way.

The arched or conical bottom B, however, instead of being formed of the same continuous splits as those which form the sides A, is formed of separate splits made of the same or different material woven together in a similar or suitable manner, and, after being nailed or otherwise secured to a flat bottom, B', is fitted into its place, as shown in fig. 2.

The said flat bottom B' may be constructed of wood or other suitable material for giving support to the arched bottom B, and to the sides A, and thereby additional strength to the basket; and, being made of suitable size and form, it is inserted into the lower end of the sides A, and secured therein by means of nails, e, said nails being driven through the lower ends of the splits which form the said sides, and into the edge of said flat bottom B, as shown. Other suitable means of securing the said bottom to the sides may be adopted.

What I claim as my invention, and desire to have secured by Letters Patent, is—

The combination of the arched wicker bottom B, and the flat solid bottom B', with each other, and with the sides of the basket, constructed substantially as and for the purpose herein described.

WILLIAM H. CARPENTER.

Witnesses:
JOHN D. ROSSET,
HENRY PALMER.